(12) United States Patent
Nishihara

(10) Patent No.: US 6,814,218 B2
(45) Date of Patent: Nov. 9, 2004

(54) CONVEYING APPARATUS

(75) Inventor: Shigeyoshi Nishihara, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 151 days.

(21) Appl. No.: 10/252,772

(22) Filed: Sep. 23, 2002

(65) Prior Publication Data

US 2003/0079967 A1 May 1, 2003

(30) Foreign Application Priority Data

Oct. 1, 2001 (JP) ........................................ 2001-304913

(51) Int. Cl.[7] ............................................. B65G 29/00
(52) U.S. Cl. .............................. 198/465.1; 198/867.01; 198/370.04; 198/850; 198/795
(58) Field of Search ........................... 198/465.1, 465.2, 198/867.01, 803.14, 795, 850, 851, 465.3, 370.04

(56) References Cited

U.S. PATENT DOCUMENTS 4,278,165 A * 7/1981 Nielsen et al.
4,635,785 A * 1/1987 Prydtz

FOREIGN PATENT DOCUMENTS

| JP | 2001-097534 | 4/2001 |
| JP | 2001-253340 | 9/2001 |
| JP | 2001-253341 | 9/2001 |

* cited by examiner

Primary Examiner—Richard Ridley
(74) Attorney, Agent, or Firm—Goodwin Procter LLP

(57) ABSTRACT

A conveying apparatus suitable for driving a number of carriers in such a manner that the front end of each carrier thrusts the rear end of the preceding carrier is provided. The conveying apparatus comprises a guide rail and carriers. The rail includes a U-turn path section. Each carrier includes a load bar assembly including at least three load bars connected end-to-end by vertical pivot shafts in such a manner that the bars can pivot horizontally relative to each other. Each carrier also includes a load support supported by the associated middle load bar. Each carrier further includes a front trolley supporting at least the front end load bar and a rear trolley supporting at least the rear end load bar. The trolleys are supported movably on and guided by the guide rail. The trolleys are fixed to and in parallel with the end load bars. The free ends of the end load bars protrude from the front end of the front trolley and the rear end of the rear trolley so that the free end of the front end load bar of each carrier and the free end of the rear end load bar of the preceding carrier can contact together in the U-turn path section.

16 Claims, 5 Drawing Sheets

CONVEYING APPARATUS

FIELD OF THE INVENTION

The present invention relates to a conveying apparatus suitable for driving a number of carriers in such a manner that the front end of each carrier thrusts the rear end of the preceding carrier.

PRIOR ART

In prior art thrust-drive conveying apparatuses, the front end of a carrier thrusts the rear end of the preceding carrier along a traveling path, which includes linear and U-turn path sections. Travel in the linear path sections occurs without thrust problems. In the U-turn path sections, adjacent carriers are not aligned linearly, but angled to each other. The direction of the thrust acting on each of the mutually angled carriers differs from the direction in which the preceding carrier moves. The difference between the directions causes a great loss of thrust. Accordingly, in order to thrust the carriers smoothly and securely in the U-turn path sections, it is necessary to maximize the radius of curvature of these sections and drive the carriers with great thrust. One type of prior art conveying apparatus includes carriers formed with driven frictional surfaces for compressive contact with driving rotors, which frictionally drive the carriers. It is difficult to thrust these carriers in the U-turn path sections of a traveling path. Accordingly, in the U-turn path sections, these carriers are driven by an end-to-end traction system.

Thus, in the prior art conventional conveying apparatus, the carriers are driven by the combination of the thrust drive system and the end-to-end traction system. In the linear path sections, the rear ends of the carriers are thrusted. In each U-turn path section, the carriers are connected end-to-end, and a driving means applies thrust to one of them, which pulls the following carriers. Each carrier of the prior art apparatus needs to include connecting means for connection to and disconnection from others carriers. The traveling path of this apparatus needs to include means for automatically disengaging the connecting means. Thus the entire apparatus is complex in structure, expensive, and complex to control.

SUMMARY OF THE INVENTION

The object of the present invention is to provide a conveying apparatus that can solve the foregoing problems. A conveying apparatus according to the present invention comprises a guide rail and carriers. The rail includes a U-turn path section. Each carrier includes a load bar assembly including at least three load bars connected end-to-end by vertical pivot shafts in such a manner that the bars can pivot horizontally relative to each other. Each carrier also includes a load support supported by the associated middle load bar. Each carrier further includes a pair of front and rear trolleys supporting at least the front and rear end load bars, respectively. The trolleys are supported movably on and guided by the guide rail. The front and rear trolleys are fixed to and in parallel with the front and rear end load bars, respectively. The free ends of the front and rear end load bars protrude from the front end of the front trolley and the rear end of the rear trolley, respectively, so that the free end of the front end load bar of each carrier and the free end of the rear end load bar of the preceding carrier can contact together in the U-turn path section.

While each carrier is traveling in the U-turn path section, the free ends of the end load bars of its load bar assembly deviate only slightly from the center line of the path section (the locus of the center of width of each trolley). This makes it possible to position the free ends on the center line.

Accordingly, in the U-turn path section, the free end of the front end load bar of each carrier and the free end of the rear end load bar of the preceding carrier can contact together at a point (the thrust point between adjacent carriers) near and even very near to the center line of the path section. Depending on the shape of the free ends, they can contact together on the center line. As a result, the thrust of each carrier acts on the preceding carrier efficiently through the free ends of their end load bars in the U-turn path section. This makes it possible to thrust the carriers smoothly and securely in the U-turn path section.

The present invention removes the need to particularly enlarge the radius of curvature of the U-turn path section and/or provide an exclusive driving means for this section. It is consequently possible to promote the practical use of a conveying apparatus in which the front end of each carrier thrusts the rear end of the preceding carrier.

In another embodiment, each of the carriers may include a load bar assembly including at least five load bars connected end-to-end by vertical pivot shafts in such a manner that the bars can pivot horizontally relative to each other. Each of the carriers may also include a load support supported by the associated middle load bar. Each of the carriers may further include a pair of front and rear load trolleys supporting the front and rear ends respectively of the associated middle load bar in such a manner that these trolleys can rotate relative to the bar each on a vertical pivot shaft. Each of the carriers may further include a pair of front and rear guide trolleys supporting the front and rear end load bars respectively.

Thus, the present invention makes it possible to drive long carriers smoothly in the U-turn path section even if this section has a relatively small radius of curvature. Further, the present invention prevents excessive torsional stress from acting on the middle load bars of the carriers due to loads.

The free ends of the end load bars may be convexly arcuate in plan view. In the U-turn path section, the convexly arcuate ends of the end load bars of adjacent carriers can contact together on or closely near the center line of this section. This makes it possible to thrust the carriers effectively in the U-turn path section.

The junction between each end load bar and the trolley supporting the end load bar may be near the joint between the end load bar and the adjacent load bar.

The present invention minimizes the overall length of each end load bar. Additionally, the present invention reduces the deviation of the joint between each end load bar and the adjacent intermediate load bar from the U-turn path section. This makes it possible to thrust the carriers more smoothly and securely in the U-turn path section.

The load bars of each load bar assembly may be connected together in such a manner that the mutually connected ends of adjacent load bars are positioned on or over each other. At least one side of each load bar may form a driven frictional surface continuing flush and linearly to the driven frictional surfaces of the other load bars in a linear path section of the guide rail.

Additionally, the present invention enables continuous friction drive of the carriers by means of their load bar assemblies in the linear path section.

EXEMPLARY EMBODIMENTS OF THE INVENTION

Exemplary embodiments of the present invention are described below with reference to the accompanying drawings. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
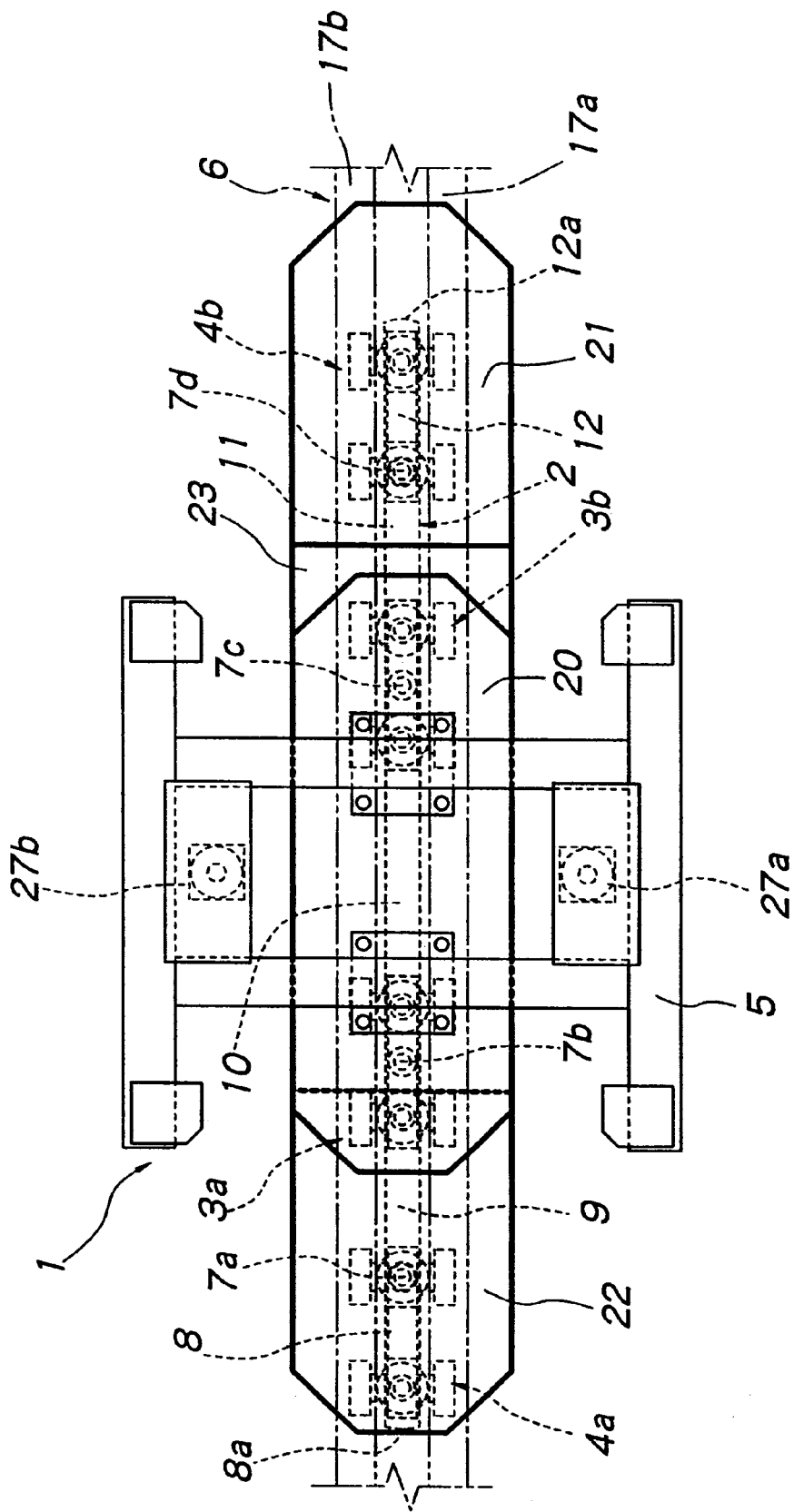
FIG. 1 is a top plan view of a carrier of a conveying apparatus embodying the present invention.
Figure 2:
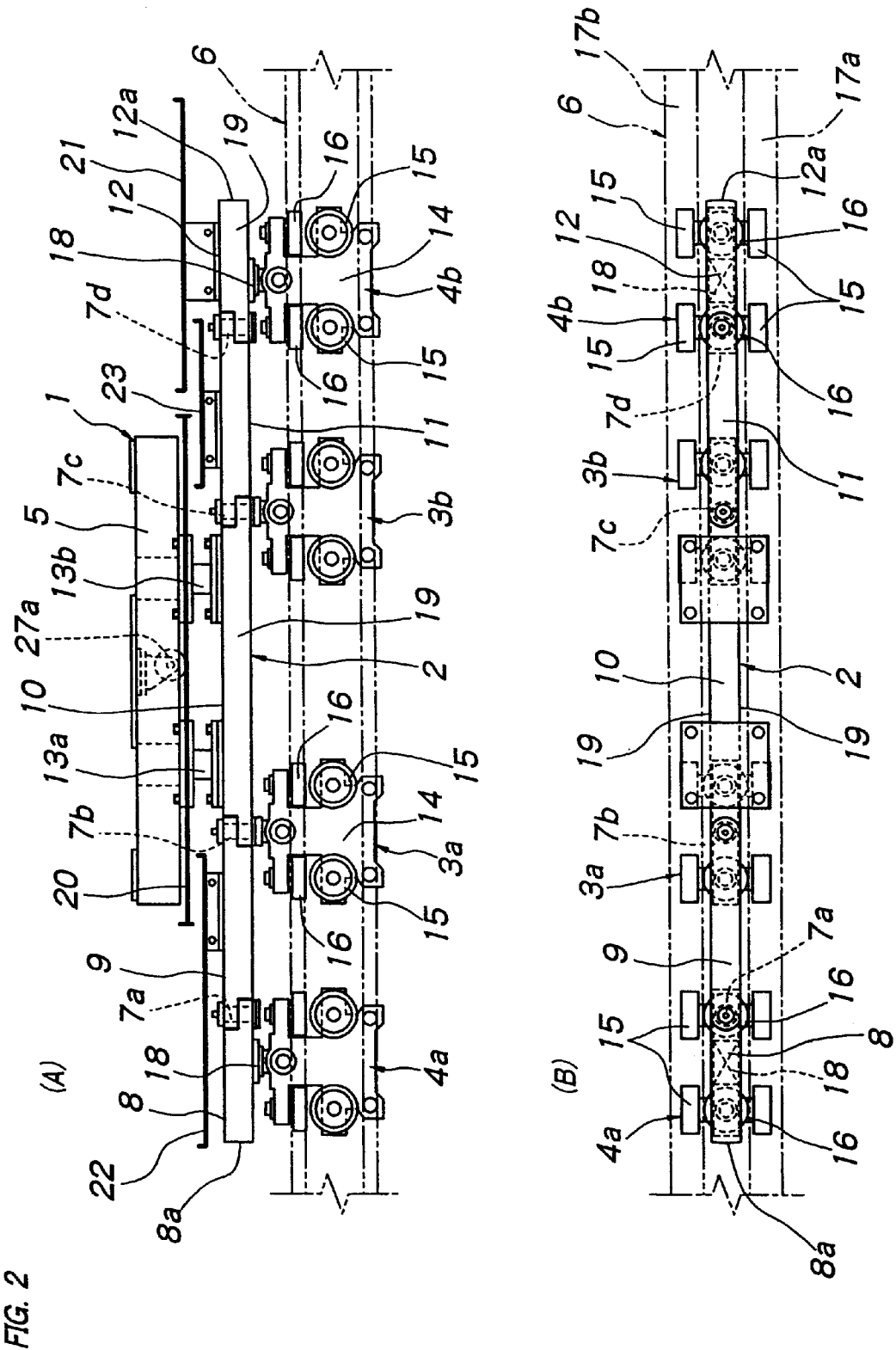
FIG. 2A is a side view of the carrier.
FIG. 2B is a top plan view of the load bar assembly and trolleys of the carrier.
Figure 3:
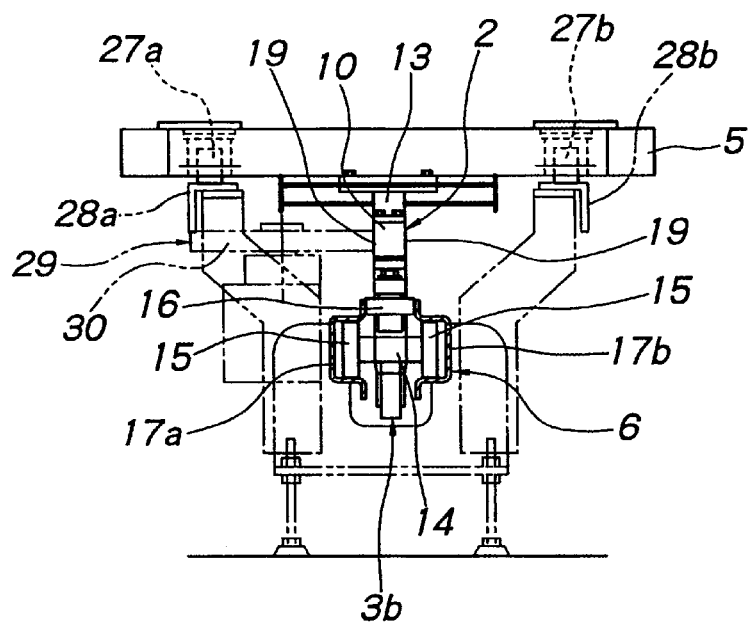
FIG. 3 is a back view of the carrier.

With reference to FIGS. 1–3, a carrier 1 consists of a load bar assembly 2, a front load trolley 3a, a rear load trolley 3b, a front guide trolley 4a, a rear guide trolley 4b, and a load support 5. The trolleys 3a, 3b, 4a and 4b are supported on and guided by a pair of guide rails 6. The load bar assembly 2 consists of five load bars 8–12, which are connected end-to-end by vertical pivot shafts 7a–7d in such a manner that they can pivot horizontally relative to each other. The load support 5 is a frame structure slightly longer than the middle load bar 10, and supported horizontally by a front support 13a and a rear support 13b on this bar.

The trolleys 3a, 3b, 4a and 4b may be identical in structure, and each include a front pair and a rear pair of supporting horizontal-axis rollers 15, a front centering vertical-axis roller 16 and a rear centering vertical-axis roller 16. The supporting and centering rollers 15 and 16 are supported rotatably by a body 14. The pair of guide rails 6 consists of a left rail 17a and a right rail 17b, each of which has a groove and an upper lip. The grooves of the rails 17a and 17b face each other. The left and right supporting rollers 15 engage with the grooves of the rails 17a and 17b respectively. The centering rollers 16 are positioned between and engage with the upper lips of the rails 17a and 17b.

The load trolleys 3a and 3b can support the front and rear ends respectively of the middle load bar 10 in such a manner that each load trolley can rotate relative to the load bar horizontally on a vertical axis. In this embodiment, the load trolleys 3a and 3b support the front and rear ends of the middle load bar 10 through the vertical pivot shafts 7b and 7c respectively, which connect this bar to the intermediate load bars 9 and 11, respectively, in such a manner that these trolleys can rotate horizontally relative to the middle load bar. Specifically, the vertical pivot shafts 7b and 7c stand on the bodies 14 of the load trolleys 13a and 13b, respectively, and connect the front and rear ends of the middle load bar 10 to the rear end of the intermediate load bar 9 and the front end of the intermediate load bar 11, respectively.

The guide trolleys 4a and 4b support the end load bars 8 and 12, respectively. Specifically, in the present embodiment, each of the guide trolleys 4a and 4b includes a mounting seat (bar junction) 18 fixed to the top of its body 14. The end load bars 8 and 12 are fixed to the mounting seats 18 of the guide trolleys 4a and 4b, respectively. The vertical pivot shafts 7a and 7d connect the end load bars 8 and 12 to the intermediate load bars 9 and 11, respectively. The pivot shaft 7a is positioned near and in the rear of the mounting seat 18 of the front guide trolley 4a. The pivot shaft 7d is positioned near and in front of the mounting seat 18 of the rear guide trolley 4b.

Figure 4:
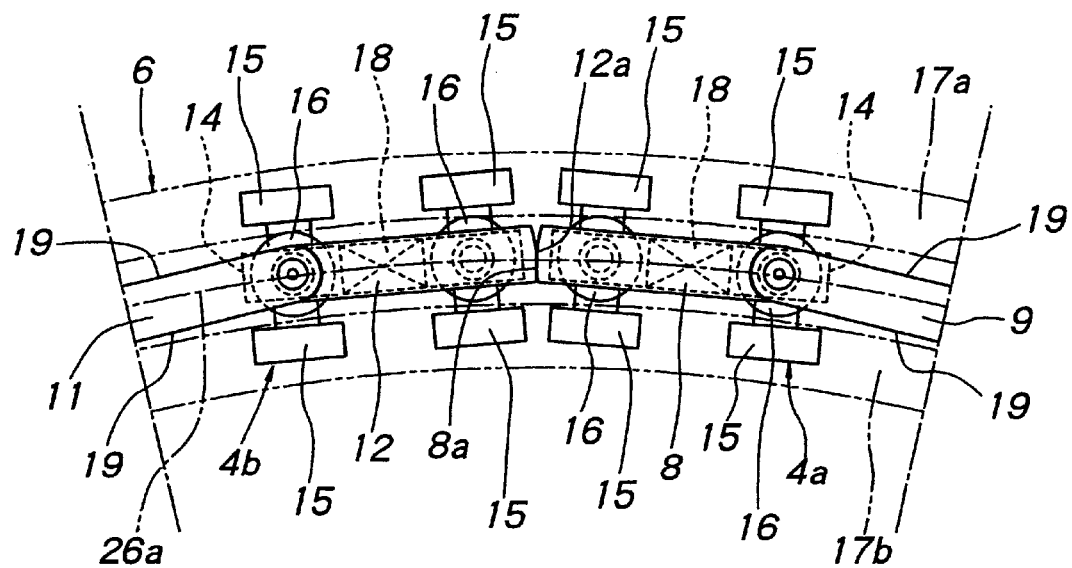
FIG. 4 is a partial top plan view of the conveying apparatus, depicting how carriers of the apparatus are thrusted in a U-turn path section of the traveling path of the apparatus.

In the present embodiment, the load bars 8–12 are rectangular in section and identical in sectional size. The middle load bar 10 is longer than the intermediate load bars 9 and 11, which are longer than the front and rear end load bars 8 and 12. The end load bars 8 and 12 are nearly equal in length to the trolleys 3a, 3b, 4a and 4b. As shown in FIG. 4, the free ends 8a and 12a of the end load bars 8 and 12 protrude slightly forward and backward from the guide trolleys 4a and 4b, respectively, and are convexly arcuate in a plan view. As shown in FIG. 2A, upper and lower halves of the connected ends of the load bars 8–12 are cut alternately. The cut ends of the load bars 8–12 are put on one another and connected by the vertical pivot shafts 7a–7d. When the load bars 8–12 are positioned in a straight line, both their sides form a pair of straight extending driven frictional surfaces 19.

A car body, for example, or another load can be supported on the load support 5 and undergo an assembly operation or another operation. If oil or other liquid or substance may drop from the supported load onto the frictional surfaces 19 of the load bar assembly 2, the carrier 1 may be fitted with a catching device, such as, for example, four oil pans 20–23. In the present embodiment, the oil pan 20 is supported by and over the middle load bar 10 under the load support 5. The oil pan 21 is supported by and over the rear end load bar 12. The oil pans 20 and 21 are positioned at the same level. The oil pan 22 is supported by and over the intermediate load bar 9 and the front end load bar 8. The oil pan 23 is supported by and over the intermediate load bar 11. These oil pans 22 and 23 are lower in level than the pans 20 and 21. The front end of the oil pan 22 protrudes slightly forward from the free end 8a of the front end load bar 8, and a rear end portion of this pan 22 extends under a front end portion of the pan 20. A front end portion and a rear end portion of the oil pan 23 extend under a rear end portion of the pan 20 and a front end portion of the pan 21 respectively. Without preventing the load bars 8–12 from pivoting on the vertical pivot shafts 7a–7d, the oil pans 20–23 can cover the overall length of the load bar assembly 2, whether in a linear or bent position.

Figure 5:
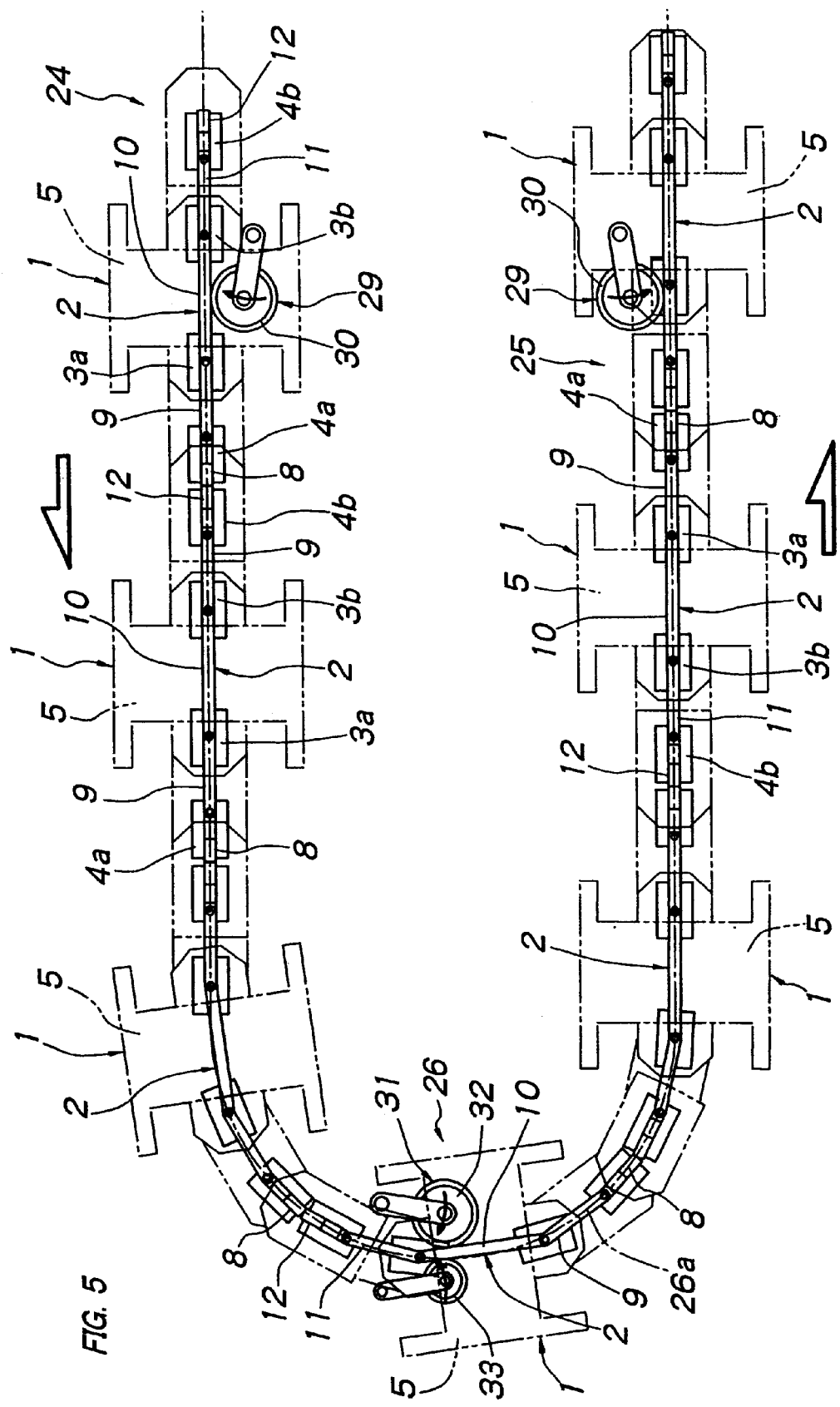
FIG. 5 is a schematic top plan view of carriers of the conveying apparatus and part of the traveling path.

A number of carriers 1 can be used on a traveling path, where, as shown in FIG. 5, the guide rails 6 may form two linear path sections 24 and 25 and two U-turn path sections 26 (only one shown). In the present embodiment, each U-turn path section 26 connects one end of one linear path section 24 or 25 and one end of the other linear path section. At least one of the linear path sections 24 and 25 may be used as an assembly line for the loads carried on the carriers 1. With reference to FIGS. 1 and 3, the load support 5 includes a right swivel wheel 27a and a left swivel wheel 27b that are supported on both sides of its bottom. The load support 5 also includes a pair of wings positioned outside both sides of the load bar assembly 2. As shown in FIG. 3, a right anti-rolling guide rail 28a and a left anti-rolling guide rail 28b may be provided in the assembly line of the traveling path to support the wings through the swivel wheels 27a and 27b respectively.

With reference to FIG. 5, in an exemplary embodiment, the carriers 1 can be driven by two friction drivers 29 and two friction drivers 31 (only one shown), all of which cooperate with the driven frictional surfaces 19 of the load bar assemblies 2 of the carriers 1. Each friction driver 29 may be positioned suitably in one of the linear path sections 24 and 25. Each friction driver 29 may include a motor-driven friction drive wheel 30 for contact with the left driven frictional surfaces 19 of the load bars 8–12. Each friction driver 31 may be positioned suitably in one of the U-turn path sections 26. Each friction driver 31 may include a motor-driven friction drive wheel 32 and a back-up roller 33 for contact with the left and right frictional surfaces 19 respectively so that the wheel 32 and the roller 33 can pinch one of the load bars 8–12. The drive wheels 30 and 32 and back-up rollers 33 may be supported movably toward and away from the traveling path, and urged for compressive contact with the frictional surfaces 19. However, the friction drivers 29 and 31 can be positioned in any suitable place, so that only the drivers 29 or 31 are used to drive the carriers 1 along the traveling path.

The required number of carriers 1 are placed end-to-end on the traveling path. The rotation of the friction drive wheels 30 and 32 at generally the same peripheral speed forward thrusts the carriers 1 of which the left driven frictional surfaces 19 are in contact with these wheels. The free end 8a of the front end load bar 8 of each thrusted carrier 1 pushes the free end 12a of the rear end load bar 12 of the preceding carrier 1 so that the carriers can be driven together forward. Thus, each carrier 1 can sequentially thrust the preceding carrier. This drives the carriers 1 on the traveling path forward in an end-to-end fashion.

When each carrier 1 moves into each U-turn path section 26, as shown in FIG. 5, the positions of its trolleys 3a, 3b, 4a and 4b become tangential to the guide rails 6 in this section 26. Consequently, while traveling in the U-turn path section 26, the carrier 1 bends along this section 26, with its load bars 8–12 pivoting on the vertical pivot shafts 7a–7d. As shown in FIG. 4, longitudinally middle portions of the end load bars 8 and 12 of each carrier 1 are fixed to its front and rear guide trolleys 4a and 4b, respectively. In the present embodiment, the free ends 8a and 12a of the end load bars 8 and 12 of each carrier 1 protrude slightly from the front end of its guide trolley 4a and the rear end of its guide trolley 4b, respectively, to such an extent that these trolleys 4a and 4b may not contact with the rear guide trolley 4b of the preceding carrier 1 and the front guide trolley 4a of the following carrier 1, respectively. Consequently, the free ends 8a and 12a of the end load bars 8 and 12 may deviate only slightly from the center line 26a of each U-turn path section 26 (the locus of the axes of the centering vertical-axis rollers 16), and are positioned on this center line 26a. Accordingly, the convexly arcuate free end 8a of the front end load bar 8 of each carrier 1 and the convexly arcuate free end 12a of the rear end load bar 12 of the preceding carrier 1 may contact together at a point (the thrust point between adjacent carriers 1) near to the center line 26a of each U-turn path section 26. The bar ends 8a and 12a may have such a radius of curvature that they can contact together on the center line 26a of each U-turn path section 26. As a result, the thrust of each carrier 1 acts efficiently on the preceding carrier 1 in each U-turn path section 26. This makes it possible to thrust the carriers 1 smoothly and securely even in the U-turn path sections 26.

The load trolleys 3a and 3b support the middle load bar 10 by means of the vertical pivot shafts 7b and 7c, respectively, which connect middle load bar 10 to the intermediate load bars 9 and 11, respectively. Alternatively, the load trolleys 3a and 3b could support the middle load bar 10 by means of other vertical pivot shafts or other suitable moveable connection devices. The carriers 1 can be driven by a known driving means other than the friction drivers 29 and 31. As an example, the carriers 1 can be thrusted by one or more pushers provided near the traveling path movably in parallel to it. The use of driving means other than the friction drivers may not need the driven frictional surfaces 19 formed on the lateral sides of the load bars 8–12, and accordingly, may not limit the shape of the bars. Each load bar assembly 2 may consist of more than five load bars. In order for each carrier 1 to carry a longer body, the load bar assembly 2 of the carrier can include one or more intermediate load bars in addition to the bars 9 and 11. Each load bar assembly 2 can consist of fewer than five load bars as stated herein. The present invention is not limited merely to linear and U-turn path sections. Instead, path sections may include right-turn sections and left-turn sections or other turn sections and sections may be connected in any suitable manner.

Figure 6:
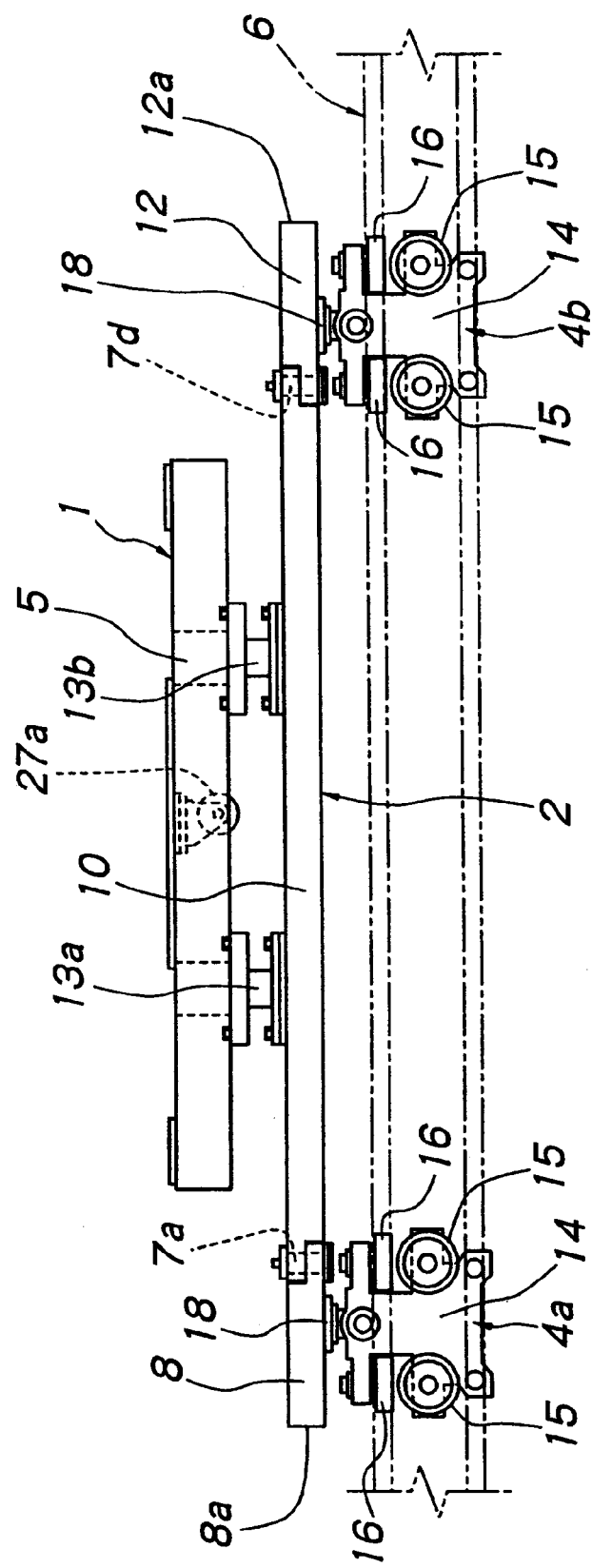
FIG. 6 is a side view of a carrier of another conveying apparatus embodying the present invention.

FIG. 6 shows another embodiment of the present invention, which includes a carrier 1 including a load bar assembly 2. The bar assembly 2 consists of a front end load bar 8, a middle load bar 10 and a rear end load bar 12, and includes no intermediate load bars (9, 11). The carrier 1 also includes a pair of guide trolleys 4a and 4b, which support the end load bars 8 and 12 respectively, and also act as load trolleys. The conveying apparatus according to the previous embodiment takes the form of a floor conveyor, in which the load bar assemblies 2, trolleys 3a, 3b, 4a and 4b, and guide rails 6 are positioned below the load supports 5. Alternatively, the present invention may take the form of an overhead trolley conveyor, which includes guide rails extending under a ceiling. The guide rails support trolleys, from which a load bar assembly hangs. The bar assembly includes a middle load bar, from which a load support hangs.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A conveying apparatus comprising:
   a guide rail, the rail including at least one U-turn path section;
   a plurality of carriers, the carriers each including:
      a load bar assembly including at least three load bars connected end-to-end by vertical pivot shafts in such a manner that the bars can pivot horizontally relative to each other; the at least three load bars including:
         a middle load bar;
         a front end load bar having a free end; and
         a rear end load bar having a free end;
      a load support supported by the middle load bar; and
      a pair of front and rear trolleys supporting at least the front and rear end load bars respectively, the trolleys supported movably on and guided by the guide rail, the front and rear trolleys fixed to and substantially in parallel with the front and rear end load bars respectively;

wherein the free ends of the front and rear end load bars protrude from a front end of the front trolley and a rear end of the rear trolley respectively so that the free end of the front end load bar of a carrier and the free end of the rear end load bar of a preceding carrier can contact together in the U-turn path section.

2. A conveying apparatus according to claim 1 wherein each of the carriers further includes:

the load bar assembly further including an intervening load bar arranged between the middle load bar and the front load bar, and an intervening load bar arranged between the middle load bar and the rear load bar, the load bars being connected end-to-end by vertical pivot shafts in such a manner that the bars can pivot horizontally relative to each other; and a pair of load trolleys for supporting the middle load bar in association with the vertical pivot shafts in such a manner that the load trolleys can rotate relative to the middle load bar on a vertical pivot shaft.

3. A conveying apparatus according to claim 2 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

4. A conveying apparatus according to claim 2 wherein a junction between each end load bar and the trolley supporting the end load bar is near to a joint between the end load bar and an adjacent load bar.

5. A conveying apparatus according to claim 4 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

6. A conveying apparatus according to claim 2 wherein the free ends of the end load bars are convexly arcuate in plan view.

7. A conveying apparatus according to claim 6 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

8. A conveying apparatus according to claim 6 wherein a junction between each end load bar and the trolley supporting the end load bar is near to a joint between the end load bar and an adjacent load bar.

9. A conveying apparatus according to claim 8 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

10. A conveying apparatus according to claim 1 wherein the free ends of the end load bars are convexly arcuate in plan view.

11. A conveying apparatus according to claim 10 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

12. A conveying apparatus according to claim 10 wherein a junction between each end load bar and the trolley supporting the end load bar is near to a joint between the end load bar and an adjacent load bar.

13. A conveying apparatus according to claim 12 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

14. A conveying apparatus according to claim 1 wherein a junction between each end load bar and the trolley supporting the end load bar is near to a joint between the end load bar and an adjacent load bar.

15. A conveying apparatus according to claim 14 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

16. A conveying apparatus according to claim 1 wherein the load bars of each load bar assembly are connected together in such a manner that mutually connected ends of adjacent load bars are positioned on or over each other, and wherein at least one side of each load bar forms a driven frictional surface continuing flush and linearly to driven frictional surfaces of the other load bars in a linear path section of the guide rail.

* * * * *